Oct. 24, 1967 R. J. MUELLER 3,349,289

HOUSING FOR ELECTRICAL APPARATUS MODULES

Filed June 22, 1966 2 Sheets-Sheet 1

INVENTOR.
ROBERT J. MUELLER

BY

Ostrolenk, Faber, Gerb & Soffen
ATTORNEYS

Oct. 24, 1967 R. J. MUELLER 3,349,289
HOUSING FOR ELECTRICAL APPARATUS MODULES
Filed June 22, 1966 2 Sheets-Sheet 2
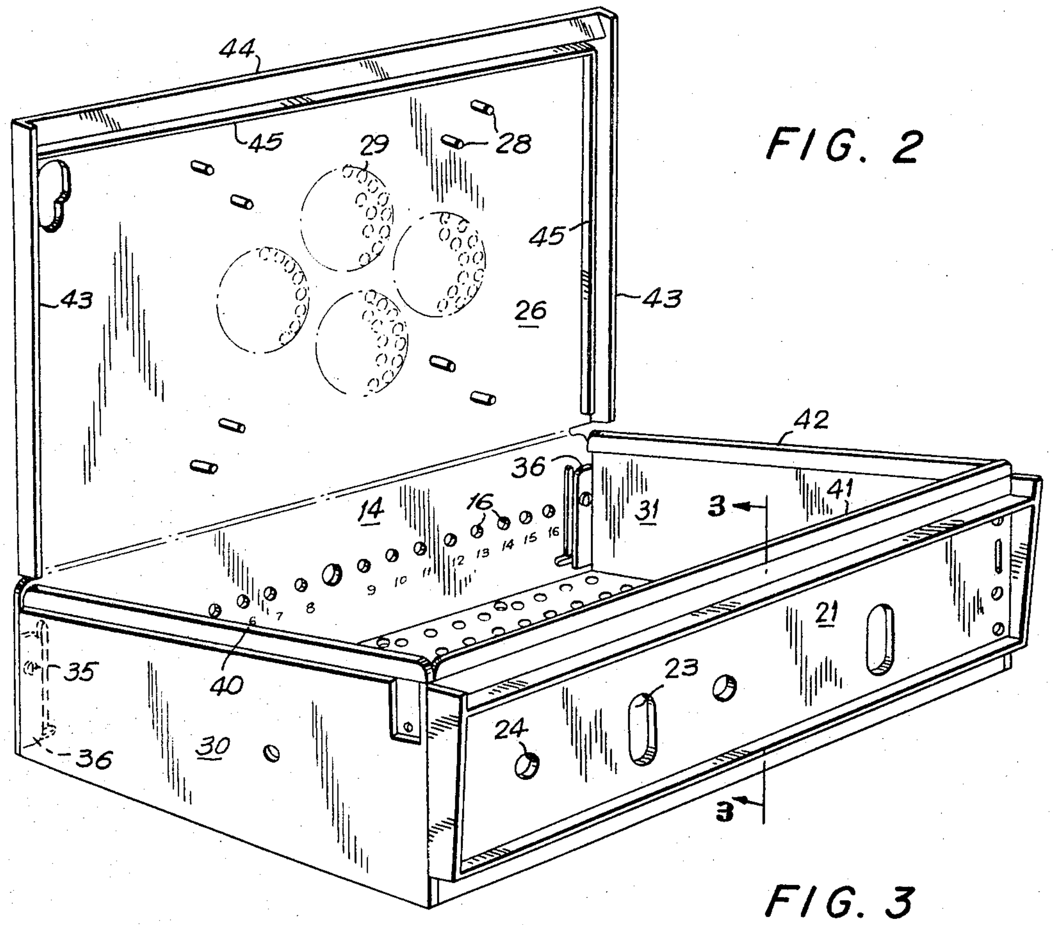
FIG. 2, FIG. 3
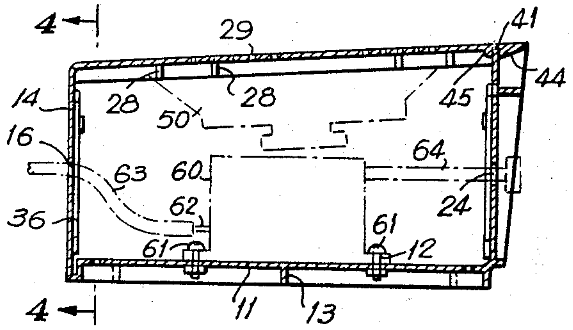
FIG. 5
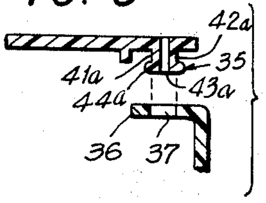
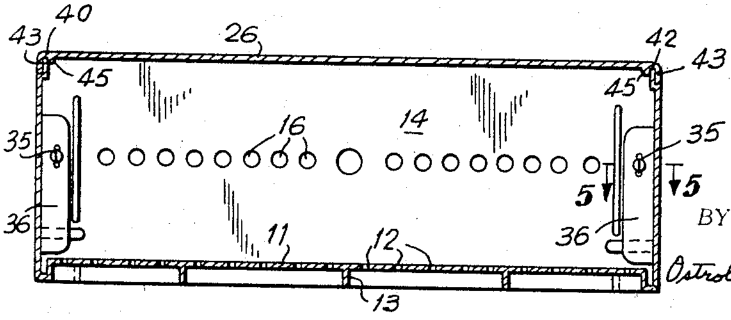
FIG. 4
INVENTOR.
ROBERT J. MUELLER
BY
Ostrolenk, Faber, Gerb + Soffen
ATTORNEYS United States Patent Office 3,349,289

Patented Oct. 24, 1967

3,349,289

HOUSING FOR ELECTRICAL APPARATUS MODULES

Robert J. Mueller, Bel Air, Calif., assignor to International Rectifier Corporation, El Segundo, Calif., a corporation of California Filed June 22, 1966, Ser. No. 559,500
9 Claims. (Cl. 317—101)

ABSTRACT OF THE DISCLOSURE

A blank for a housing for containing electrical apparatus modules, consisting of six sides held together by flexible connectors enabling them to be folded to form an enclosed container; one side having a plurality of apertures dispersed over its surface, permitting various modules to be mounted in various positions as the specific apparatus requires; the sides being held in an uplifted condition by connectors consisting of an aperture on the edge of one side which receives a lug on the adjacent edge of the next adjacent side; the top side having at least two spaced ribs between which are positioned the upper edges of the other sides to reopenably close the top of the housing.

This invention relates to a housing for an electrical apparatus and, more particularly, to a unitary housing structure for mounting and containing electrical apparatus modules.

It is always desirable to reduce the number of different items in an inventory. Accordingly, the present housing is designed to contain and mount electrical apparatus modules for many different electrical apparatus. AM or FM radios, AC to DC house power converters, and many different types of amplifiers, are only a few of the many apparatus in connection with which the housing of the instant invention might be employed.

In addition, when an apparatus housing is employed in do-it-yourself home construction, it may be desirable that the housing be easy to put together. The housing of the present invention satisfies this requirement.

Also, it is desirable that the housing be simple to manufacture for sale. The present housing lends itself to manufacture in a single stamping or molding operation, which is very simple and inexpensive to perform.

The housing of the present invention is formed from a unitary sheetlike structure designed so that when it is folded, it forms a six-sided enclosed structure. The bottom side of the housing has a plurality of apertures to mount electrical apparatus modules. Two sides have apertures to permit terminal lead wires entry into and exit from within the housing and to permit module control elements mounted external to the housing to be connected to the modules within. The housing is retained in its enclosed form by a simple connecting means, comprised of lugs mounted adjacent first edges of some of the sides of the housing which engage apertures in tabs extending away from the edge of the side of the housing adjacent each lug. The top of the housing has a tab adjacent all its edges and a rib on its surface spaced slightly away from the tab, thereby enabling the top edges of the folded upward sides of the housing to be held by the top side of the housing completing the enclosure of the housing. The top of the housing might have a sound wave permeable grille and adjacent mounting lugs for an electroacoustic speaker, thereby enabling sound from a speaker mounted on the lugs to exit from within the housing.

Accordingly, it is a primary object of the present invention to provide a housing for electrical apparatus which can be interchangeably employed in connection with a plurality of different electrical apparatus.

It is a second object of the present invention to provide a housing for electrical apparatus which is easy to manufacture and which is comprised of a single sheet of material.

It is another object of the present invention to provide such a housing having simple connecting means to enable the housing to remain closed.

These and other objects of the present invention will become apparent when the following description is read in conjunction with the accompanying drawings in which:

FIGURE 2 shows the housing of FIGURE 1 so folded as to provide a space for electrical apparatus modules and with the top side open.

FIGURE 3 is a cross-section through the housing of FIGURE 2 along the line and in the direction 3—3 showing the top side of the housing closed.

FIGURE 4 is a view in the direction 4—4 of FIGURE 3.

FIGURE 5 is a cross-section taken in direction 5—5 of FIGURE 4 showing the connecting means which holds the sides of the housing of the instant invention together.

Figure 1:
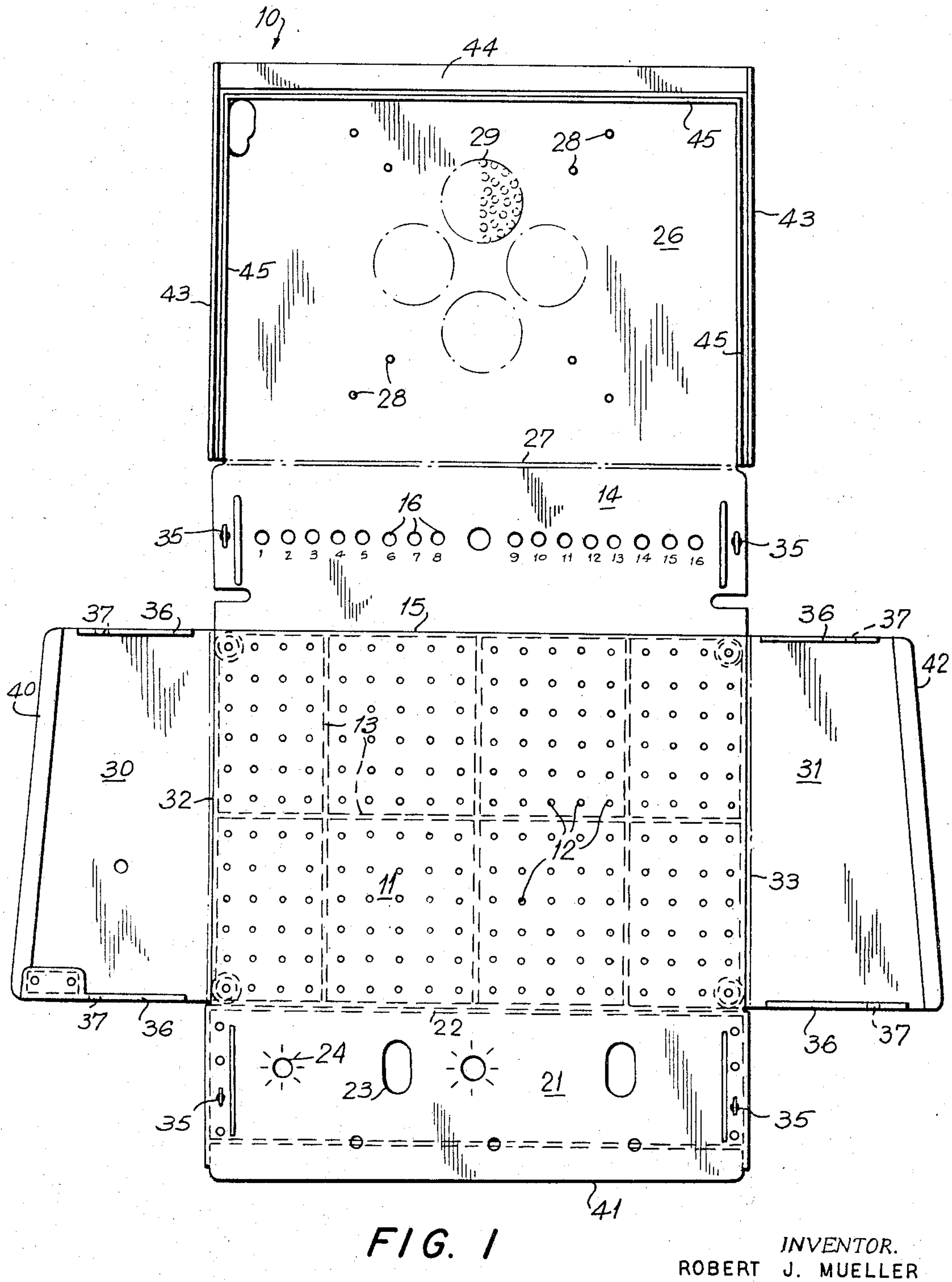
FIGURE 1 is a plan view of a single sheet of material formed so that it might be made into a housing for electrical apparatus modules.

Referring to the drawings, the housing 10 is made from a unitary sheetlike structure which is divided into a number of portions which serve as sides of the completed housing. The material of the housing might be a molded or stamped plastic or another easily shaped material. The housing 10 has a first or bottom side 11 which has a plurality of mounting means 12 to enable electrical apparatus modules to be connected to side 11. The means 12 may consist of apertures passing through the side 11. The apertures can be arranged in a pattern. As shown in the figures, the apertures 12 can be arranged in two sets of parallel rows, the first set being perpendicular to the second set, with each aperture being in one row in each set of rows. On the underside of the side 11 are support ribs 13, which prevent flexing of the side 11.

A second or rear side 14 is connected by a flexible connector along its edge at 15 to an edge of the side 11. There are a plurality of apertures 16 passing through the side 14 which permit wires, e.g., 63, from the terminals of modules mounted to apertures 12 to pass from within to without the closed housing.

A third or front side 21 is connected at 22 by means of a flexible connector to the opposite edge of side 11 from side 14. Side 21 might also have apertures, e.g., 23 and 24, passing therethrough to permit either module control elements disposed without the housing or module terminal lead wires to pass from within to without said housing.

The fourth or top side or cover 26 of the housing is connected at 27 by means of a flexible connector to the edge of side 14. The side 26 can have mounting lugs 28 thereto affixed for receiving the mounting means of an electroacoustic loud speaker 50. The side 26 might also have sound wave permeable grille 29 disposed such that when a loud speaker is mounted on the lugs 28, the sound emanating therefrom passes from within to without the housing through the grille 29. The grille 29 might consist of a plurality of apertures, as shown in FIGURE 2.

Sides 30 and 31 are, respectively, connected at 32 and 33, by means of a flexible connector to the remaining opposite sides of bottom side 11 of the housing. These sides complete the enclosure of the housing 10.

After the sheet of housing material 10 has been formed substantially, as shown in FIGURE 1, the sides 14, 31, 21 and 30 are folded up in the manner shown in FIGURE 2.

To hold them in their uplifted position, a separate connecting structure is required. The connecting structure consists generally of a lug adjacent the edge of one side of the housing engaging an aperture in a tab extending away from the edge of the adjacent side of the housing, thereby holding the two engaged sides folded upward. As can be seen in FIGURE 1, sides 14 and 21 have lugs 35 adjacent their free edges. The lugs 35 extend generally perpendicularly away from the sides 14 and 21.

The sides 30 and 31 have tab members 36 adjacent their free edges. The tabs 36 extend generally perpendicularly away from the sides 30 and 31. Passing through each tab 36 is a means for engaging the lug 35, which in this case consists of an aperture 37. The aperture 37 is so positioned on a tab 36 that when adjacent sides are folded upward into position, a lug 35 is in position to be inserted through an aperture 37.

Referring to FIGURE 5, note that each lug 35 consists of a first and second portion **41*a* and 42*a* which are normally biased apart to be separated by a gap 43*a*. This enables the lug 35 to be squeezed to a smaller width when the portions 41*a* and 42*a* are pressed together. The lug 35 might also have a widened head portion 44*a*. The width or diameter of the head 44*a* of the lug 35 and/or the body of the lug 35 itself is, when gap separated, greater than the width of the aperture 37. However, when the lug 35 is forced through the aperture 37, as it must be in order to lock adjacent sides of the housing in their uplifted position, the portions 41*a* and 42*a* of the lug 35 are squeezed together by the walls of the aperture 37 and the width of the lug 35 decreases, thereby permitting the head 44*a* and the lug 35 to slip into and through the aperture 37. Once the head 44*a* is through the aperture 37, it serves as a shoulder resting against the tab 36, thereby preventing the lug 35 from slipping back out of the aperture. If there is no head 44*a* on lug 35, the biasing force driving the portions 41*a* and 42*a* of the lug apart will cause the lug to frictionally engage the walls of the aperture, thereby holding the lug therein. When it is desired to separate the sides of the housing 10, the side of the housing to which the lug 35 is attached is pulled away from the adjacent side, which causes the portions 41*a* and 42*a* of the lug 35 to squeeze together, thereby permitting the lug 35 and its head 44*a* to slide out of the aperture 37**.

Once the sides 14, 31, 21 and 30 are secured in their folded-up position, as shown in FIGURE 2, then the top side 26 is closed over the three edges 40, 41 and 42, respectively, of the sides 30, 21 and 31. In order to secure the top side 26 over the edges 40, 41 and 42, the top side is provided adjacent its two opposite free edges with a tab 43 and adjacent its remaining free edge with a biasing tab 44.

Spaced away from the tabs 43 and 44, and extending slightly away from the surface of the side 26, is the rib 45. When the top side 26 is closed over the edges 40, 41 and 42, these edges are captured between the tabs 43, 44 and the rib 45, thereby retaining the top side 26 in a closed position. The biasing tab 44 helps to secure the top side 26 over the edge 41.

Depending upon the type of electrical apparatus with which the present housing is to be employed, there may be mounted on the lugs 28, an electroacoustic loudspeaker module 50, which would face the permeable grille 29 and would send sound therethrough and out of the housing. The loudspeaker would be connected with other modules within the housing 10 in a manner not shown.

There would also be at least one module 60 which would be mounted on side 11 of the housing by means of fastening elements 61 passing through apertures 12. The module 60 has electrical terminals 62 to which are connected terminal lead wires 63. The wires might be connected with other modules (not shown) within the housing 10 or might extend through the apertures 16 to other modules or to a power source (not shown) external to the enclosed housing.

The module 60 might have a control element 64 thereto attached, which control element would extend from within to without said housing through an aperture 24.

Although there has been described a preferred embodiment of this novel invention, many variations and modifications will now be apparent to those skilled in the art. Therefore, this invention is to be limited not by the specific disclosure herein, but only by the appending claims.

The embodiments of the invention in which an exclusive privilege or property is claimed are defined as follows:

I claim:

1. A blank for a housing for electrical apparatus modules, each module having wires extending therefrom and each module having mounting means extending therefrom;

said blank having a plurality of sides including a first side having a first and a second surface and having a plurality of first means constructed and positioned for receiving the mounting means from at least one electrical apparatus module, thereby enabling at least one electrical apparatus module to be mounted on said second surface of said first side;

a second and a third side, each having a first and a second surface and having a plurality of first and second apertures therethrough to permit electrical apparatus module control elements to be passed therethrough and to permit the lead wires of the electrical apparatus modules to be passed therethrough;

a fourth, fifth and sixth side, each having a first and a second surface;

each of said first, second, third, fourth, fifth and sixth sides having first, second, third and fourth substantially straight edges;

a plurality of first connecting means connecting said first edge of said first side to said first edge of said second side, said third edge of said first side to said first edge of said third side, said second edge of said first side to said first edge of said fifth side, said fourth edge of said first side to said first edge of said sixth side and said third edge of said second side to said first edge of said fourth side;

said second and said fourth edges of each of said second, third, fifth and sixth sides having either one of second and third connecting means positioned adjacent thereto;

said second and third connecting means being so positioned that each of said second means is positioned to be engaged by one of said third means when said blank is formed into an enclosed housing;

a fourth connecting means positioned adjacent at least one of said second, third and fourth edges of said fourth side and comprising a first tab member extending substantially perpendicularly away from said second surface of said fourth side, and a rib member extending away from said second surface of said fourth side and being parallel to said second tab member and being spaced away therefrom, whereby said third edge of at least one of said third, fifth and sixth sides can be fitted securely into the space between said first tab member and said rib member.

2. The blank for a housing of claim 1 in which, said plurality of first connecting means are comprised of a flexible material integral with said sides adjacent thereto;

each of said second connecting means comprising a second tab member extending substantially perpendicularly away from said second surfaces of said fifth and sixth sides;

at least one third aperture in each of said tab members;

each of said plurality of third connecting means comprising at least one lug; each of said lugs comprising at least two portions defining an open gap and which are biased apart; each of said lugs having a first cross-sectional dimension in a plane parallel to said second surfaces of said second and third sides when the said portions are separated and a second cross-sectional dimension when the said portions are moved toward one another;

said third apertures being surrounded by internal walls separated by a dimension greater than said second dimension and less than said first dimension, whereby when each of said lugs is positioned in one of said third apertures, said internal walls surrounding said third apertures move said portions together, thereby permitting said lugs to pass into said third apertures and holding said lugs in said third apertures.

3. The blank for a housing of claim 1, wherein said first means are of sufficient number and are dispersed about said first side in a manner to be able to interchangeably receive one or more various modules in various locations, as required.

4. The blank for a housing of claim 3 in which said second apertures are arranged in two sets of parallel rows, the first of said sets of rows extending perpendicular to the second of said sets of rows; each of said second apertures being in one row in each of said sets of rows.

5. The blank for a housing of claim 4 in which, ribs are positioned on said first surface of said first side for restricting its ability to flex.

6. In combination, a housing for electrical apparatus modules, and at least one electrical apparatus module;

said housing being comprised of a blank;

said blank having a plurality of sides including, a first side having a first and a second surface and having a plurality of first means constructed and positioned for receiving the mounting means from at least one electrical apparatus module, thereby enabling at least one electrical apparatus module to be mounted on said second surface of said first side;

a second and a third side, each having a first and a second surface and having a plurality of first and second apertures therethrough to permit electrical apparatus module control elements to be passed therethrough and to permit the lead wires of the electrical apparatus modules to be passed therethrough;

a fourth, fifth and sixth side, each having a first and a second surface;

each of said first, second, third, fourth, fifth and sixth sides having first, second, third, and fourth substantially straight edges;

a plurality of first connecting means connecting said first edge of said first side to said first edge of said second side, said third edge of said first side to said first edge of said third side, said second edge of said first side to said first edge of said fifth side, said fourth edge of said first side to said first edge of said sixth side and said third edge of said second side to said first edge of said fourth side;

said second and said fourth edges of each of said second, third, fifth, and sixth sides having either one of second and third connecting means positioned adjacent thereto;

said second and third connecting means being so positioned that each of said second means is positioned to be engaged by one of said third means when said blank is formed into an enclosed housing;

a fourth connecting means positioned adjacent at least one of said second, third and fourth edges of said fourth side and comprising a second tab member extending substantially perpendicularly away from said second surface of said fourth side, and a rib member extending away from said second surface of said fourth side and being parallel to said second tab member and being spaced away therefrom, whereby said third edge of at least one of said third, fifth and sixth sides can be fitted securely into the space between said second tab member and said rib member;

said second and said third connecting means being in engagement; said fourth connecting means being in engagement with said third edge of at least one of said second, fifth and sixth sides;

said second surface of said fourth side positioned opposite said second surface of said first side when said last-mentioned third edge is engaged by said fourth connecting means;

said module having electrical input terminals, electrical output terminals, and fifth connecting means connected to said first means for receiving module mounting means;

said modules having lead wires extending from the terminals thereof and being passed through said first aperture.

7. The combination of claim 6 wherein, said first means are of sufficient number and are dispersed about said first side in a manner to be able to interchangeably receive one or more various modules in various locations, as required.

8. The combination of claim 6 in which, said plurality of first connecting means are comprised of a flexible material integral with said sides adjacent thereto;

each of said second connecting means comprising a first tab member extending substantially perpendicularly away from said second surfaces of said fifth and sixth sides;

at least one third aperture in each of said tab members;

each of said plurality of third connecting means comprising at least one lug; each of said lugs comprising at least two portions defining an open gap and which are biased apart; each of said lugs having a first cross-sectional dimension in a plane parallel to said second surfaces of said second and third sides when the said portions are separated and a second cross-sectional dimension when the said portions are moved toward one another;

said third apertures being surrounded by internal walls separated by a dimension greater than said second dimension and less than said first dimension, whereby when each of said lugs is positioned in one of said third apertures, said internal walls surrounding said third apertures move said portions together, thereby permitting said lugs to pass into said third apertures and holding said lugs in said third apertures.

9. The combination of claim 6 also including, input leads connected to said input terminals and output leads connected to said output terminals; said output leads passing through at least one of said first apertures;

at least one module control means connected to said at least one module for controlling the operation of said module; said control means passing through at least one of said second apertures.

References Cited

UNITED STATES PATENTS

| | | | |
|---|---|---|---|
| 2,991,356 | 8/1961 | Harasek | 317—101 X |
| 3,177,407 | 4/1965 | Paterson | 317—101 |
| 3,224,822 | 12/1965 | Kirby | 220—31 X |
| 3,236,410 | 2/1966 | Swartz | 220—62 |

ROBERT K. SCHAEFER, *Primary Examiner.*

M. GINSBURG, *Assistant Examiner.*